United States Patent [19]
McVoy

[11] Patent Number: 4,530,008
[45] Date of Patent: Jul. 16, 1985

[54] SECURED COMMUNICATIONS SYSTEM
[75] Inventor: David S. McVoy, Columbus, Ohio
[73] Assignee: Broadband Technologies, Inc., Sarasota, Fla.
[21] Appl. No.: 625,182
[22] Filed: Jun. 27, 1984

Related U.S. Application Data

[63] Continuation of Ser. No. 537,556, Oct. 3, 1983, abandoned, which is a continuation of Ser. No. 227,165, Jan. 22, 1981, abandoned.

[51] Int. Cl.³ .................. H04N 7/16; H04K 1/04
[52] U.S. Cl. ...................... 358/123; 358/86; 358/114; 358/117; 358/122
[58] Field of Search ............ 358/84, 86, 114, 117, 358/122, 123

[56] References Cited

U.S. PATENT DOCUMENTS

| | | | |
|---|---|---|---|
| 3,050,712 | 8/1962 | Bruck | 358/84 |
| 3,333,198 | 7/1967 | Mandell et al. | 358/86 |
| 3,581,209 | 5/1971 | Zimmerman et al. | 358/86 |
| 3,668,307 | 6/1972 | Face et al. | 358/86 |
| 3,790,700 | 2/1974 | Callais et al. | 455/4 |
| 3,801,735 | 4/1974 | Gabrid | 455/4 |
| 3,806,814 | 4/1974 | Forbes | 455/4 |
| 3,886,302 | 5/1975 | Kosco | 358/114 |
| 4,057,829 | 11/1977 | Moorehead | 358/86 |
| 4,106,060 | 8/1978 | Chapman, Jr. | 458/66 |
| 4,161,751 | 7/1979 | Ost | 358/114 |
| 4,313,132 | 1/1982 | Doles et al. | 358/86 |
| 4,331,974 | 5/1982 | Cogswell et al. | 358/86 |
| 4,367,557 | 1/1983 | Stern et al. | 358/118 |

Primary Examiner—S. C. Buczinski
Attorney, Agent, or Firm—Wender Murase & White

[57] ABSTRACT

Apparatus and method for reducing the cost and complexity of equipment placed on subscriber's premises in a subscription communications system, such as a cable television system, while at the same time providing security against unauthorized system access includes a microprocessor controlled frequency converter in proximity to the subscriber's premises to convert information transmission signals to subscriber-receivable frequencies; a channel selection unit at the subscriber's premises for producing a command signal to initiate the transmission of information to the subscriber; and a verification circuit coupled to receive the command signals, to verify the same and electronically to instruct the microprocessor. The microprocessor may be provided with plural, plug-in converter modules for feeding signals to several subscribers and may be made responsive to subscriber generated auxiliary function signals from alarm detector units, utility meter reading devices, and the like.

24 Claims, 6 Drawing Figures

SECURED COMMUNICATIONS SYSTEM

This application is a continuation, of application Ser. No. 537,556, filed Oct. 3, 1983, now abandoned, which is a continuation of application Ser. No. 227,165, filed Jan. 22, 1981, now abandoned.

BACKGROUND OF THE INVENTION

1. Field of the Invention

The present invention relates to two-way communications systems and, more particularly, to such systems provided with safeguards against unauthorized system access.

2. Description of the Prior Art

Cable television systems have long been in use in rural areas where television reception by conventional means is made impossible due to the great distance of such areas from the transmitting station. For related reasons, such systems have also been used in areas where reception is difficult due to man-made interference or other impediments. An example of this second category is the metropolitan area of major cities where high-rise buildings often block conventional television broadcasts.

Due to the recent interest in home entertainment centers capable of showing the latest movies or sports events, CATV systems are now generally in demand by both urban and suburban residents. Furthermore, advances in the field of fiberoptics and satellite communications have now made possible the transmission and reception of television signals from distant cities and even countries, thus enabling a viewer to watch more than just those stations which can be received locally by conventional means.

In order to meet the growing demand for CATV and other subscription communications services, many systems have been invented and are known in the art. A typical communications system of this general type includes a program source which transmits simultaneously all of the various audio and video signals along the transmission medium, be it cable, fiberoptic bundle, communications satellite, microwave link, or the like. In the subscriber's home, an up-frequency converter is provided having a tunable local oscillator and a fixed-frequency down-converter. In such a system, the tunable converter is used to select the desired frequency, i.e., program, which may be viewed on the subscriber's television when tuned to a predetermined unused channel.

While such systems have received widespread acceptance, they generally suffer from two major problems. First, the circuit component located in the subscriber's home, namely, the tunable converter, is a relatively expensive part of the system and is often lost, stolen or damaged by the subscriber. Second, such systems are not secure against unauthorized access, since the frequency converters can easily be copied for use by non-subscribers. While this latter problem can be partially overcome by utilizing frequency converters of complicated designs, or by scrambling the transmitted signals at a central location and de-scrambling subsequently, either solution results in significantly increased costs, often to the point of rendering the system economically impractical.

A further security-related problem is the prevention of access by a subscriber to programs for which he is not authorized. For example, a subscriber authorized to receive only those channels showing movies should not be permitted to receive those channels showing sporting events for which he has not paid. Furthermore, a subscriber should receive no service at all unless his account is fully paid. In the event a subscriber is to be disconnected from the system for nonpayment or other reasons, it is also desirable to minimize the cost of such termination.

Several subscription communications systems are known in the art which have attempted to solve one or more of the foregoing problems. For example, U.S. Pat. Nos. 3,886,302 and 4,161,751 both disclose communications systems utilizing a computer or memory at the headend station location to compare subscriber requests with records of payment and authorized program reception. An authorized request results in the enabling of equipment located at the subscriber's home or tap-off location, thereby allowing viewing of the requested program whereas an unauthorized request would not result in enablement of the equipment. The systems disclosed by these patents involve a considerable amount of complex equipment located in the subscriber's home, however, which represents a considerable cost factor and is a decided disadvantage.

SUMMARY OF THE INVENTION

It is, therefore, an object of the present invention to construct a subscription communications system secured against unauthorized access.

Another object of the present invention is to minimize the cost and complexity of equipment located at a subscriber's premises as part of a communications system, as well as minimizing the cost of connecting and disconnecting subscribers from the system.

The present invention has a further object in the construction of a communications system which provides control for other devices at a subscriber's premises, including units for reading utility meters, circuits for controlling auxiliary devices, and devices for triggering an alarm signal upon the occurrence of any of a number of predetermined conditions, such devices capable of being added to the system at relatively low costs by utilizing components already incorporated into the system.

The present invention is summarized as a communications system which includes a microprocessor-tuned frequency converter in proximity to the subscriber's premises to convert information transmission signals to a subscriber-receivable frequency; a channel selection unit at the subscriber's premises for producing a command signal to initiate the transmission of information to the subscriber; and a verification circuit coupled to receive the command signals, to verify the same and electronically to instruct the microprocessor.

The present invention is advantageous over the prior art in that a communications system is provided which is secure against unauthorized use, requires no costly or complex scrambling circuits, uses simple and inexpensive control and conversion networks at the subscriber's premises, and enables a plurality of auxiliary functions to be performed in addition to the primary communications function.

Further objects and advantages of the present invention will be apparent from the following description of a preferred embodiment when taken in conjunction with the accompanying drawings.

DESCRIPTION OF THE PREFERRED EMBODIMENT

Figure 1:
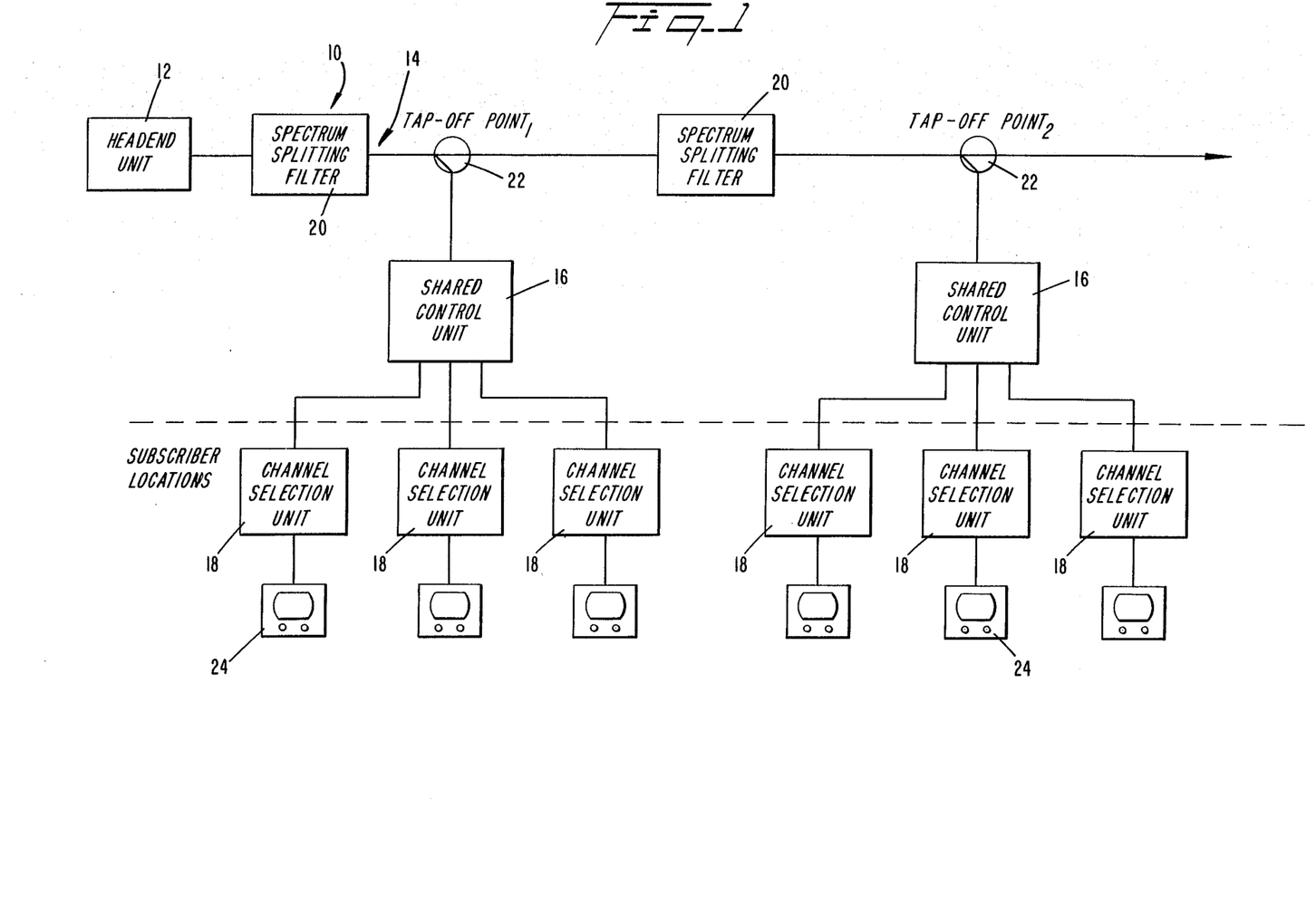
FIG. 1 is a block diagram of a preferred embodiment of a secured communications system in accordance with the present invention.

A preferred embodiment of a communications system in accordance with the present invention is illustrated in block diagram in FIG. 1 and is designated generally by reference character 10. The communications system 10 preferably is of the coaxial cable type, it being understood that any number of other types of transmission systems may be used. For example, transmission systems in the form of telephone lines, microwave links, fiberoptic cables, communications satellites and the like may be employed in the system according to the present invention. Also, it will be understood that the present invention may incorporate a multi-cable coaxial system; a single cable system being illustrated and described herein solely for the sake of clarity and brevity.

The system 10 includes four basic units: a headend unit 12, a transmission medium 14, at least one shared control unit 16 in proximity to several subscribers, and a plurality of channel selection units 18 located at each individual subscriber's premises. The headend unit 12 is located at the originating or central office of the system and is connected to deliver signals to and receive signals from the transmission medium 14. As set forth above, a transmission medium of the coaxial cable type will be described herein solely for the sake of brevity and convenience. It can be appreciated that the present invention may be utilized with different types of transmission networks, such as fiberoptic cables, microwave links, satellite systems and the like.

The present invention is intended to provide a two-way communications system in which radio frequency (RF) carriers are sent out from the headend unit 12 to the various terminal points in the system while at the same time data can be sent back to the headend unit 12 over the cable system from the terminal points. By convention, communications from the headend to the terminal points are called forward direction communications, whereas communications from the terminal points back to the headend unit are called reverse direction communications. The present invention employs a single cable network 14 for communication in both the forward direction and the reverse direction by utilizing spectrum splitting filters 20. In operation, the high end of the spectrum, such as the 50–300 MHz frequency range, carries the forward direction communications while the low end of the spectrum, such as the 5—30 MHz frequency range, carries the reverse communications. Spectrum splitting filters 20 may also be provided with amplifying means so as to compensate for losses in signal amplitude caused by the length of the cable 14 or the amount of equipment connected thereto.

The shared control units 16 are connected at spaced locations along cable network 14 for communication with the headend unit 12 by means of directional couplers 22. These coupler 22, which may be of any suitable type known in the art, permit signals to move from the transmission medium 14 to the shared control unit 16 in both forward and reverse directions without substantially reducing the signals carried further down the system by the transmission medium 14.

Each shared control unit 16 is also connected by appropriate individual cables to a plurality of channel selection units 18 located at each of the individual subscriber's premises. The channel selection units 18 are connected to suitable receiving means, such as a television receiver 24, and permit each subscriber to communicate with the headend unit 12 via the shared control unit 16 in order to receive information from the headend unit 12 at the subscriber's receiver 24.

In operation, a subscriber-initiated signal corresponding to a request for a desired communication is transmitted from the channel selection unit 18 to the shared control unit 16 where it is then communicated to the headend unit 12 via coupler 22 and cable network 14. In response to the subscriber-initiated signal, headend unit 12 sends a control signal in the forward direction down the cable network 14, through the coupler 22 to the shared control unit 16. Shared control unit 16 responds to this control signal to tune a converter, resulting in the delivery of a single preselected communications signal to the appropriate subscriber's channel selection unit 18 for reception on television 24. This command signal from the headend unit 12 may either be the requested communication, in the event the subscriber's request is an authorized one, or some type of prerecorded message in the event the subscriber's request is unauthorized.

Figure 2:
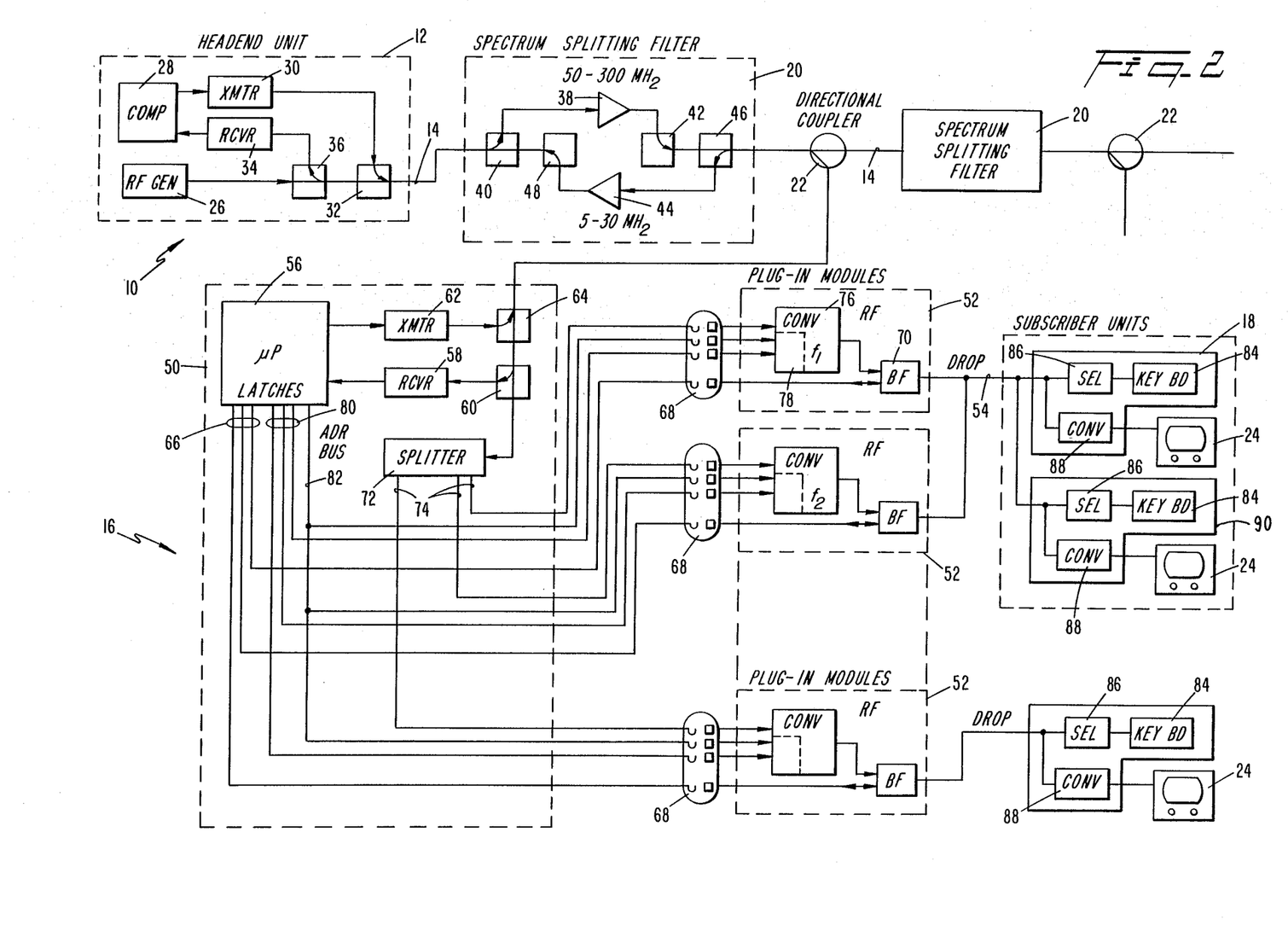
FIG. 2 is a block diagram showing the details of the system of FIG. 1 according to the present invention.

Referring to FIG. 2, in system according to the present invention is therein illustrated in detail. The headend unit 12 includes forward direction signal generating equipment, generally represented by block 26. In a cable television network, for example, such equipment 26 would include television cameras, video tape recorders, amplifiers, controllers, interconnecting cable networks and the like. All of this equipment is conventional and may take any suitable form designed to supply information signals onto the main cable network 14. These forward direction signals from generating equipment 26 are carried by the cable network 14, through the coupler 22, to the shared control unit 16 and ultimately to the appropriate subscriber's channel selection unit 18 and receiving means 24.

Other signals carried in the forward direction to the subscriber's premises are generated by a station computer 28 included in the headend unit 12. The signals produced by computer 28 are preferably of a digital format comprising a pulsed waveform; in order to accurately communicate the information contained in such signals over long distances of cable network 14, however, it is desirable to convert the digital signals into RF-modulated form. This conversion is accomplished by means of a transmitter 30 receiving the digital signals from the computer 28 and delivering the RF-modulated signals onto the cable network 14 by means of an insertion circuit 32. The insertion circuit 32, as well as other insertion circuits described hereinbelow, is of a known design capable of introducing a signal onto the cable network 14 with relatively low signal loss and without interfering with any signals already present on the cable 14.

The station computer 28 also functions as a verification circuit and, therefore, includes storage, recording and comparing networks so as to analyze reverse direction signals from the subscriber locations, verify such signals in comparison with prerecorded data and produce output instruction or command signals accordingly. Since these reverse direction signals are also carried on the main cable network in RF-modulated form, it is necessary to transform such signals into digital format for utilization by the computer 28. To accomplish this, a receiver 34 is connected to the cable network 14 by means of an extraction circuit 36, said receiver 34 delivering the transformed reverse direction signals to the station computer 28. The extraction circuit 36, as well as other extraction circuits described hereinbelow, is of a type known in the art capable of delivering signals carried on the cable network 14 to auxiliary devices, such as the receiver 34, without substantially affecting the signals on the cable network 14.

As set forth above, the forward direction signals from the headend unit 12 are carried simultaneously on the cable network 14 along with the reverse direction signals from the subscribers by dividing the signals into two distinct frequency ranges. Accordingly, several spectrum splitting filters 20 are included at various points in the cable network 14 to minimize crossover between the ranges and, thus, prevent interference between forward and reverse direction signals. The spectrum splitting filters 20 are also capable of amplifying the signals carried on the cable network 14 so as to compensate for losses in amplitude due to excessive cable lengths. To accomplish these functions, each spectrum splitting filter 20 is provided with a first tuned amplifier 38 which acts only upon signals in the forward direction frequency range. The amplifier 38 is connected upstream to the cable network 14 by an extraction circuit 40 and redelivers the amplified forward direction signals downstream to the cable network 14 by means of an insertion circuit 42. A second tuned amplifier 44 tuned to the reverse direction frequency range is connected downstream of the cable network by means of an extraction circuit 46 and upstream of the cable network 14 by means of an insertion circuit 48.

The shared control units 16 are connected to the cable network 14 at appropriate points by means of directional couplers 22. These couplers 22 are of a type known in the art and are functionally equivalent to the combination of an extraction circuit and an insertion circuit, as described hereinabove. Thus, each coupler 22 is capable of carrying both forward and reverse direction signals to and from the cable network 14 and the shared control units 16 without substantially affecting the signals carried on the cable network 14.

Each shared control unit 16 connected to the cable network 14 comprises a main unit 50 provided with a plurality of converter modules 52. Each separate module 52 is connected to a respective one of the channel selection units 18 in the subscribers' premises by means of a separate cable drop 54 and is adapted to be plugged into the main unit 50. Therefore, new subscribers may be added to the communications system 10 simply by plugging additional converter modules 52 into the main unit 50 and providing appropriate cable drops 54 from the modules to the subscribers' premises.

The main unit 16 includes a microprocessor 56 having an input connected to the cable network 14 by a receiver 58 and an extraction circuit 60, and having an output similarly connected to the cable by a transmitter 62 and an insertion circuit 64. The transmitter 62, receiver 58, and insertion/extraction devices 64, 60 function in the same manner as transmitter 30, receiver 34 and insertion/extraction circuits 32, 36 described above for converting RF-modulated signals carried on cable network 14 to digital form for use by the microprocessor 56, and vice versa. Thus, forward direction signals transmitted from the headend unit 12 are routed through the receiver 58 to the microprocessor 56, whereas reverse direction signals initiated by the microprocessor are routed from the microprocessor 56 through transmitter 62 back to the headend unit 12.

Microprocessor 56 is also provided with a plurality of subscriber data terminals 66 to facilitate two-way communication with the subscribers. Each subscriber data terminal 66 is connected through a connector 68 to a bandpass filter 70 and to the cable drop 54 going to the subscriber's premises. Since the main unit 50 is located centrally relative the subscribers serviced by it, and thus is relatively close to each subscriber's location, the signals transmitted between the microprocessor 56 and the subscribers can remain in digital form and need not be RF-modulated. This permits information to be exchanged in serial digital form to and from the microprocessor 56 via each subscriber data terminal 66.

The main unit 50 is also provided with a signal splitter 72 connected to the cable network 14 and having a plurality of signal output terminals 74 each connected through connectors 68 to the plug-in modules 52 corresponding to each subscriber. Each of the plug-in modules 52 includes a frequency converter 76 having a local oscillator 78 the frequency of which can be remotely tuned in response to a digital input. Local oscillator 78 may be of any suitable type, such as a phase locked loop circuit, a voltage controlled oscillator provided with a digital-to-analog converter, or any similar frequency synthesizer responsive to a digital input. The tuning signal is provided to all local oscillators 78 as a multi-bit digital word and each oscillator 78 is provided with an individually-accessed latching circuit (not shown) which is operated to record the digital word for use by the oscillator. Microprocessor 56 is connected to each local oscillator 78 individually by means of a plurality of latch control lines 80, and collectively by a common address data bus 82. All of these connections are made to the modules 52 through connectors 68. The output of each converter 76 as controlled by the local oscillator 78 is fed to the bandpass filter 70 and down the cable drop 54 to each subscriber's location.

At the subscriber location, the channel selector unit 18 includes a keyboard 84 which can be manually operated to generate digital output signals delivered to a selector circuit 86. Selector circuit 86 generates a command signal in digital form in response to the operation of keyboard 84, and such command signal is fed via cable drop 54 back to the shared control unit 16. The cable drop 54 is also connected to another frequency converter 88 provided in the channel selector unit 18 adapted to be coupled to the input terminal of the subscriber's television receiver 24.

The frequency converter 76 associated with each module 52 is an up-frequency converter capable of providing output signals at a preselected frequency, arbitrarily designated as $f_1$. The frequency converter 88 at the subscriber's location is a down-frequency converter tuned so as to convert signals of frequency $f_1$ to the frequency of any unused channel in the area where the subscriber is located. To provide for reception of different signals by more than one television receiver at a particular subscriber's location, a module 52 having an up-converter tuned to a different frequency, such as module 90 at frequency $f_2$, may be provided and connected to the same subscriber's cable drop 54, as shown in FIG. 2. At the subscriber's location, the incoming cable drop 54 is fed not only to the first channel selection unit and television receiver, but also is connected to second channel selection unit, however, the frequency converter 88 is tuned so as to convert incoming signals at frequency $f_2$, rather than frequency $f_1$, to the frequency of an unused channel.

It can be appreciated, therefore, that a plurality of television receivers in a particular subscriber's premises may be serviced over a single cable drop 54 simply by providing corresponding frequency converters 76 and 88 each tuned to a unique frequency $f_1$. This results in substantial cost savings in terms of equipment and installation services when a subscriber desires to increase the amount of service to his premises.

In a conventional CATV system, the subscriber's converter unit generally consists of a local oscillator and up-converter which, under the command of a keyboard or switch assembly, selects the channels desired and converts them to an intermediate frequency. A down-converter then converts the intermediate frequency signals to the frequency of an unused TV channel for viewing. In the present system, however, the functions are split, with the local oscillator and up-converter assembly being located in the shared control unit 16 and the down-converter and keyboard located at the subscriber's premises. Furthermore, since the down-converter in the present system is fixed in frequency and requires no adjustment by the subscriber, it is therefore possible to locate both up- and down-converters in the same module 52 in the shared control unit 16. In this case it should be appreciated that down-converters tuned to different unused TV channels would be required to receive different programs on different receivers over a single drop cable.

In operation, when a subscriber desires to watch a particular television channel, an appropriate entry is made on the keyboard 84 which causes the selector circuit 86 to generate a digital command signal. This digital command signal is fed up the cable drop 54 to the shared control unit 16 where it is directed through the plug-in module 52 to the microprocessor 56. In response, as shown in flow chart form in FIG. 3, the microprocessor 56 computes the appropriate digital information corresponding to the selected channel (step 11) and delivers such digital information to the local oscillator 78 of the subscriber's converter 76 via address bus 82 (step 102). The appropriate latch control line 80 is then energized (step 104) so as to cause the converter 76 to select and deliver a signal corresponding to the requested program from the cable network 14 down the cable drop 54 to the subscriber's home. Accordingly, the subscriber will immediately receive the requested television channel upon proper operation of the keyboard 84.

Figures 3, 4:
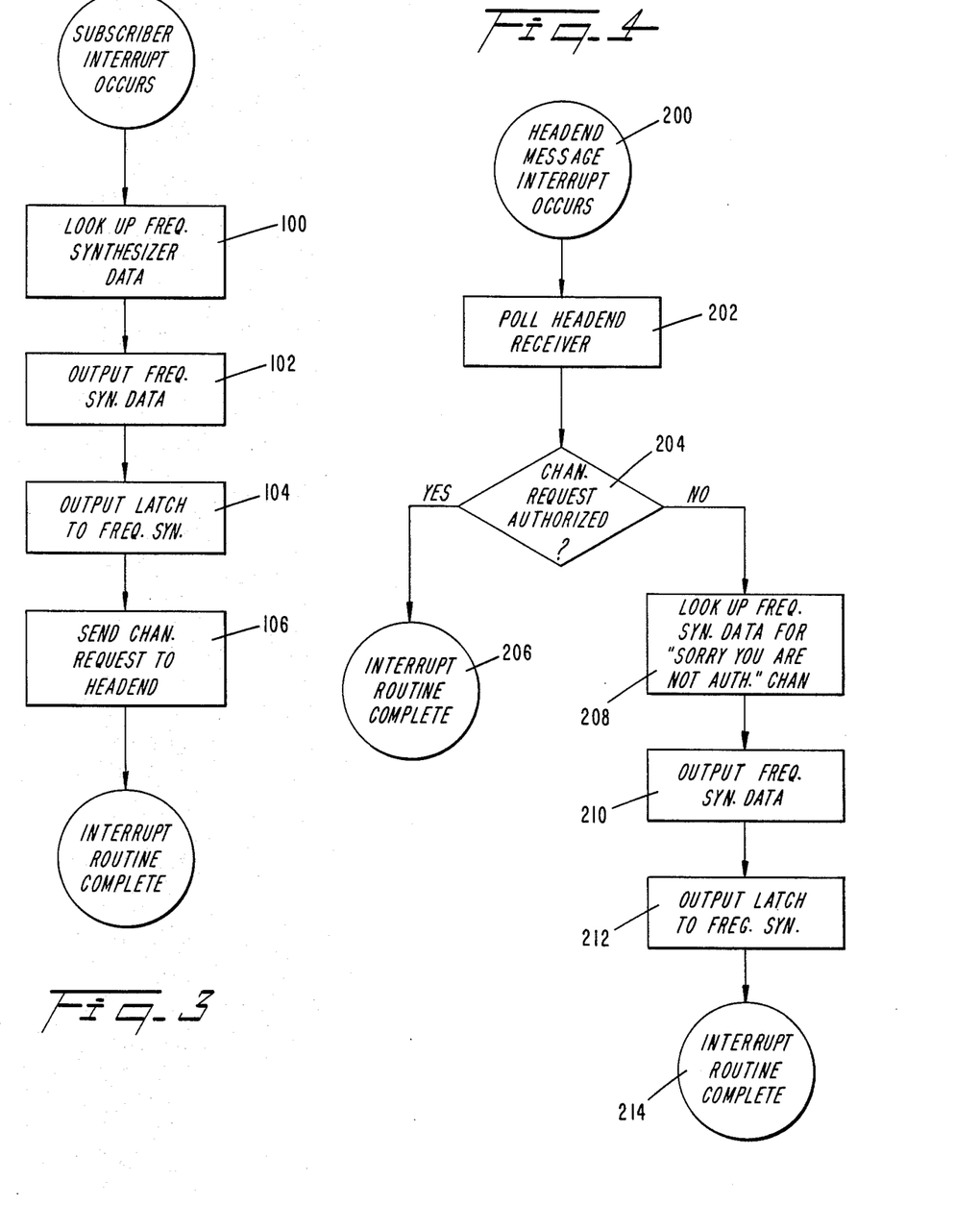
FIG. 3 is a flow chart showing a first operation of the system of FIG. 2 according to the present invention.
FIG. 4 is a flow chart showing a second operation of the system of FIG. 2 according to the present invention.

After microprocessor 56 has adjusted the subscriber's converter 76 in the manner described hereinabove, the subscriber's request is communicated from the microprocessor 56 to the transmitter 62 where it is RF-modulated and transmitted onto the cable network 14 to the headend unit 12 (step 106) where it is received through receiver 34 by the station computer 28. In response to this request signal, the computer 28 generates an instruction signal which is delivered in digital form to transmitter 30 where it is RF-modulated and transmitted via cable network 14 through receiver 58 to the microprocessor 56.

The particular instruction signal generated by station computer 28 is dependent upon whether or not the subscriber's request is authorized, as shown in flow chart form in FIG. 4. After a subscriber request has been made, the microprocessor 56 waits for an interrupt request from headend 12 and, upon receipt of such interrupt request (step 200) causes the microprocessor 56 to poll the headend receiver 58 for the remainder of the information included in the subscriber's request signal (step 202). If the computer 28 has determined that the request is an authorized one, the microprocessor 56 recognizes the authorization (step, 204) and the interrupt routine is complete (step 202). Since the microprocessor 56 had previously adjusted the converter 76 in that subscriber's module so that the requested program could be received, no further action is needed. If the request is an unauthorized one (step 204), however, the instruction signal generated by computer 28 causes microprocessor 56 to look up a predetermined frequency channel from the headend corresponding to a message such as "Sorry, you are not authorized to receive the requested channel" (step 208) and output this frequency on bus 82 (step 210). Once the frequency is present on the bus 82, a signal is transmitted via the appropriate latch control line 80 to the tunable oscillator 78 of the subscriber's converter 76 (step 212) so as to latch the predetermined frequency on bus 82 into the tunable oscillator 78. In this manner, the preprogrammed message is delivered down the cable drop 54 to the subscriber's receiver and the routine is complete (step 214).

By allowing the subscriber to immediately view the requested channel sending verification of the request by station computer 28, the present system permits the subscriber to rapidly scan all channels available in the system without having to await verification of authorization for each channel. In this manner, a subscriber may scan the various channels in order to make his selection.

Since the subscriber's request for viewing access is transmitted to the station computer 28, the computer may be programmed to log and tabulate such information for billing, survey, or other purposes, as appropriate. Furthermore, the keyboard 84 may be used in accordance with the present invention for transmitting any type of numeric or alphanumeric information back to the shared control units 16 where it may be reformatted and transmitted by microprocessor 56 back to the headend unit 12. By using this technique, opinion polling, home shopping, and interactive television programming can readily be accomplished.

Figure 5:
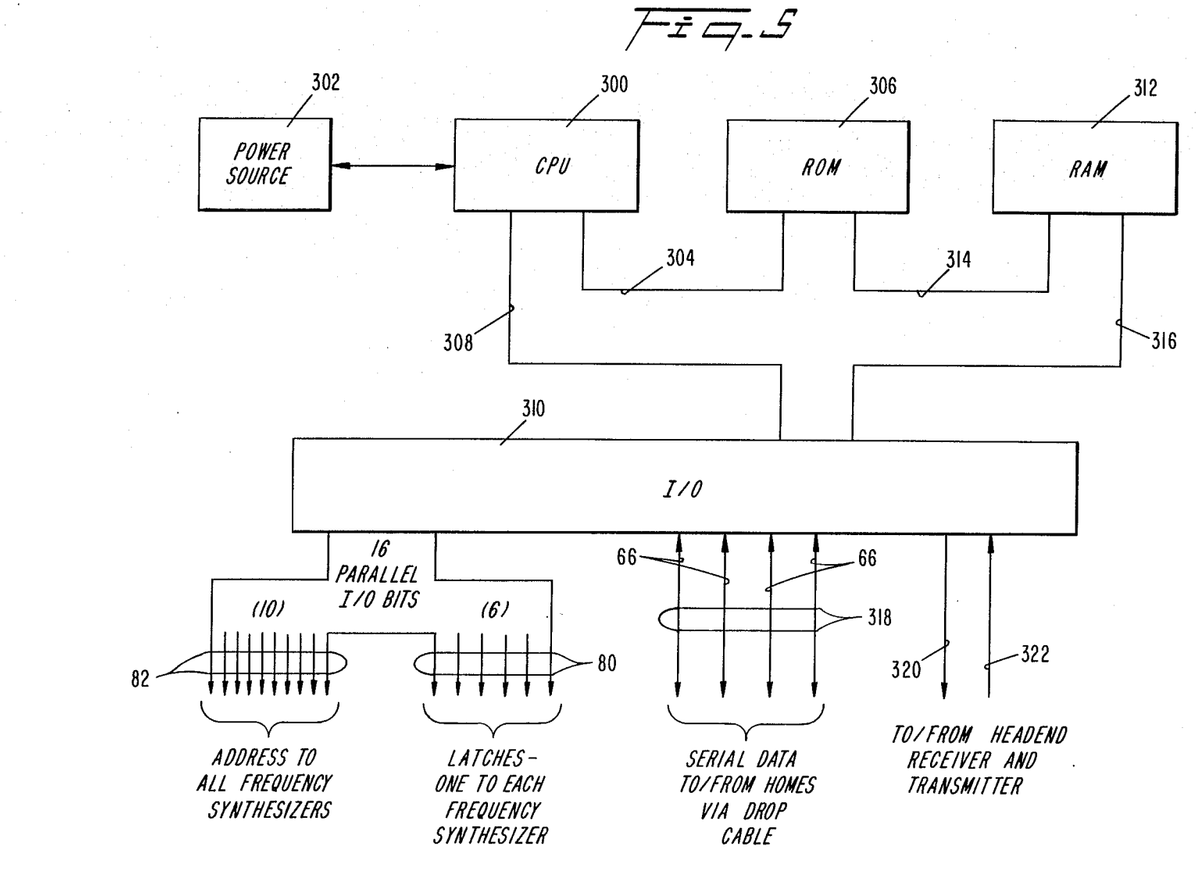
FIG. 5 is a block diagram showing the details of a microprocessor of the system of FIG. 2 according to the present invention.

A preferred embodiment of microprocessor 56 is illustrated in block diagram in FIG. 5 in which the reference characters correspond to those of FIG. 2. The microprocessor is operated by a control processor unit, or CPU, 300 connected to a source of power 302. Control of power source 302 may be provided from the headend unit 12 or this power may be left on at all times. CPU 300 is connected by a bus line 304 to a read-only-memory or ROM 306 and by another bus line 308 to an input/output device 310. A random-access-memory or RAM 312 is also connected via bus lines 314 to ROM 306 and by bus lines 316 to I/O 310. The CPU, ROM, RAM and I/O are all devices known in the art, and bus lines 304, 308, 314 and 316 provide control thereover through the exchange of digital information corresponding to data, address and control of each device.

I/O 310 provides interface between the microprocessor and the other system equipment: address bus lines 82 and latch control lines 80 are connected to control the frequency of tunable oscillators 78 of each subscriber's converter 76; a plurality of subscriber lines 318 connect the subscriber terminals 66 to each cable drop 54 going to the subscriber's premises; transmitting line 320 is connected to transmitter 62 for sending reverse direction signals to the headend unit 12; and receiving line 322 is connected to receiver 58 for receiving forward direction signals from the headend unit 12.

When subscriber requests or command instructions are received on lines 318, 320 or 322, CPU-300 causes examination of ROM 306 for the appropriate response information. For example, a request or instruction to tune a subscriber's converter 76 to a particular channel would cause CPU 300 to look up the appropriate frequency synthesizer data in ROM 306 in order to exercise control over tunable oscillator 78. This frequency synthesizer data would be delivered to all tunable oscillators 78 by address bus lines 82 whereupon a signal delivered on the appropriate latch control line 80 would cause tuning of only that subscriber's tunable oscillator so that only the subscriber making the request will receive the transmitted message and the other subscribers will remain unaffected.

By providing a RAM 312 in the microprocessor, the present system may be expanded to provide a multitude of different services to the subscribers in addition to standard CATV operation. For example, a subscriber may be able to operate the system so as to utilize microprocessor 56 and RAM 312 as a personal computer for keeping financial records, shopping lists, and other computer functions controlled by the keyboard 84. Alternately, the RAM 312 could be programmed with information corresponding to a video game for the subscriber's use. By allowing communication between the subscribers and the station computer 28, the present system permits each subscriber to call-up from station computer 28 and deliver to the microprocessor 56 the various programs and functions desired to be performed.

The present system provides security against unauthorized use since access to information channels is controlled by the station computer 28 at the headend and since tuning of the desired channel is accomplished by microprocessor 56 at the location of the shared control unit 16 so that only those individual subscribers who are authorized to be connected to the system and to receive the requested information will be permitted to receive that information. In the event that a subscriber's channel selection unit is stolen and is attempted to be used by an unauthorized individual, the station computer 28 will recognize that the generated command signals are unauthorized and will provide appropriate instructions to microprocessor 56 to prevent access by the thief. In this manner, expensive and complex circuits and/or scrambling networks are not required and the system is provided with a high degree of security against unauthorized access.

At the same time, the circuitry located at the subscriber's premises is extremely simple since it consists essentially of nothing more than a simple keyboard, a digital signal generator, and a down-converter. The more expensive local oscillator, up-converter and microprocessor circuits are located outside the subscribers' homes at the shared control unit 16, with a sharing of costs among the several subscribers which are plugged into that particular unit. Accordingly, the initial outlay for equipment is considerably less than many prior art systems while at the same time providing a high degree of security and placing relatively inexpensive components at the subscriber's premises.

Figure 6:
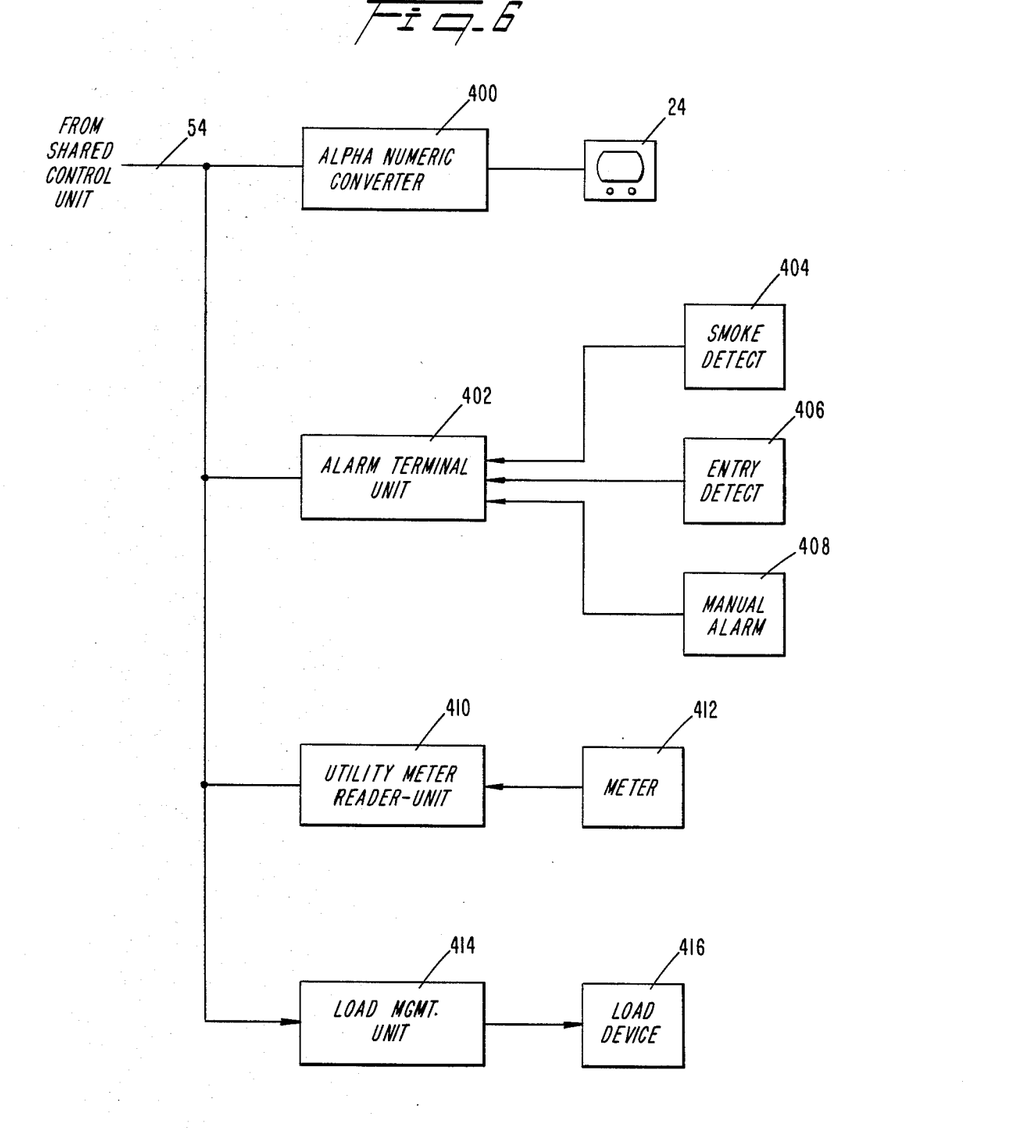
FIG. 6 is a block diagram of auxiliary devices located at the subscriber's premises for use in the system according to the present invention.

Because of the use of a microprocessor 56 at the location of the shared control unit 16, a two-way communications system according to the present invention may accomplish numerous additional functions at relatively little additional costs. Referring to FIG. 6, the system can be configured to operate as a teletext unit for viewing news, weather or sports information presented in alphanumeric format. This is accomplished by means of an alphanumeric converter 400 connected between the cable drop 54 and the conventional television receiver 24 in the subscriber's home. In operation, a subscriber would use the keyboard 84 to input a particular code to microprocessor 56 through the selector circuit 86. The coded request received by microprocessor 56 would be reformatted and relayed via the cable network 14 to the system headend 12. The requested information would, in turn, be transmitted back over the cable network 14 to the microprocessor 56 where it would be reformatted and transmitted down the cable drop 54 to the alphanumeric converter 400. The converter 400 would transform the data into standard video format for display on the receiver 24.

Another device which can be installed in the subscriber's home is an alarm terminal unit 402. This unit may be provided with a plurality of input terminals for connection to any number of switchable alarm condition responsive devices such as a smoke detector 404, window and door switches 406, and manually-operated push button panic alarms 408. The alarm conditions recognized by these input devices would then cause alarm terminal unit 402 to generate appropriate digital signals for transmission up the cable drop 54 to the microprocessor 56. The microprocessor 56 can be programmed to recognize these input signals and to transmit reformatted alarm signals back to the headend 12 for appropriate action.

The alarm terminal unit 402 can be designed to transmit an output signal periodically as directed by an internal timing circuit to indicate that the alarm unit is operating properly. The absence of the periodic output signal at the appropriate time interval would be recognized by microprocessor 56 and an alarm signal generated in a response thereto would then be transmitted to the headend unit 12. Alternately, the alarm terminal unit 402 may be adapted to be interrogated by the microprocessor 56 at predetermined intervals to verify that the alarm circuitry is in proper operating condition. In order to allow an alarm signal to be manually-generated by the push button device 408 without interfering with other control signals presently on the cable drop 54, the alarm terminal unit 402 can be provided with circuitry for detecting the existence of such control signals before the alarm signal is sent to the microprocessor on cable drop 54.

A utility meter reader unit 410 may also be connected to the drop line 54 and located in the subscriber's home. The reader unit 410 is connected at an input to the output of a utility meter 412 and operates in a manner similar to that of the alarm terminal unit 402 to provide data to the station headend 12 regarding utility meter 412.

The present invention may also be programmed to provide control functions to various pieces of equipment located at the subscriber's premises. To this end, a load management circuit 414 adapted to receive control signals in digital format from microprocessor 56 over cable drop 54, has an output connected to a load device 416, which may be any suitable device, such as a hot water heater. In operation, a command provided by the station headend 12 would be transmitted in a forward direction over the cable network to the microprocessor 56. The microprocessor 56 would in turn reformat the data and transmit an appropriate instruction signal down the cable drop 54 to the load management circuit 414. The load management circuit 414, in response to the receipt of the instruction signal, would provide an output to the load device 416 which may include any suitable electromechanical device responsive to the output signal for controlling the operation of the load.

A communications system according to the present invention allows the inclusion of auxiliary devices such as those described hereinabove at a minimum of cost by utilizing equipment already present in the system. The only additional equipment needed to implement any one of the auxiliary functions is the equipment located in the subscriber's home and connected to the cable drop 54. The operation and control of such additional auxiliary function equipment is then provided for merely by entering additional information at the station computer 28 and the microprocessor 56.

It can be appreciated from the foregoing that the present invention exhibits several distinct advantages over the prior art. First, the invention provides improved security in a subscription communications system in that only one channel at a time may be transmitted to a subscriber's premises and that channel is transmitted only if the subscriber is authorized to receive it. In addition, the present invention enables the reduction in system operating costs in that the connection and disconnection of subscribers' services can be accomplished at the system headend without sending a serviceman into the field. Also, the present invention provides enhanced ability to provide complete two-way transmission of various forms of data and requires a reduced initial capital outlay for equipment costs in that expensive circuit components are shared by several subscribers.

The present invention has several further advantages in that the system is modular and can be expanded as needed, will operate with multiple outlets in a single home or business over a single cable drop, and that the control units located at the subscriber's premises are inexpensive and can only be used at the authorized location programmed into the headend computer. Since the circuit located at the subscriber's premises can only be used at that particular location, any attempt to make a copy of the circuit and use the same at an unauthorized location will be fruitless. Similarly, any attempt to steal a subscriber's circuit and use it at an unauthorized location will, again, be unsuccessful in gaining system access.

A system according to the present invention also provides enhanced flexibility in configuring a multitude of functions into the system for use by subscribers. The use of a station computer in conjunction with a programmable microprocessor allows the system parameters to be easily changed to reflect additional or cancelled subscribers, or the existence of equipment for performing auxiliary functions in the subscriber's premises. Moreover, the present system may be used by a subscriber for services other than routine CATV reception such as use as a personal computer, home video game or the like, by means of changing the information stored in the station computer and main unit microprocessor.

Inasmuch as the present invention is subject to many variations, modifications and changes in detail, it is intended that all matter contained in the foregoing description or shown in the accompanying drawings shall be interpreted as illustrative and not in a limiting sense.

What is claimed is:

1. In a communications system including an information source for transmitting a plurality of information signals from a central location, and at least two means for receiving signals, each at a preselected frequency, and each being disposed at a different subscriber's location and each having a corresponding drop line connected thereto, a control network comprising:

a channel selection means at each of the subscriber's locations for generating command signals corresponding to said information signals;

verification means in communicative connection with said channel selection means and interposed between said information source and channel selection means and operable for generating a control signal in response to a valid command signal; and a microprocessor-tuned frequency conversion means physically separate from and space apart from the at least two signal receiving means and connected thereto through the corresponding drop lines, said frequency conversion means being interposed between the verification means and the at least two signal receiving means and operable to selectively pass one of said plurality of information signals to each of said signal receiving means at the preselected frequency thereof through the corresponding drop line thereof in response to a corresponding one of said command signals.

2. The invention as recited in claim 1 wherein said microprocessor-tuned frequency conversion means comprises a microprocessor circuit responsive to said control signal for generating a digital tuning signal, a tunable frequency synthesizer responsive to said digital tuning signal for generating a local oscillator output signal, and a first frequency converter coupled to receive the local oscillator output signal from said frequency synthesizer.

3. The invention as recited in claim 2 wherein said tunable frequency synthesizer and said first frequency converter are assembled to form a module.

4. The invention as recited in claim 2 wherein said signal receiving means further comprises a second frequency converter coupled to said first frequency converter to produce a signal of and intermediate frequency in response to a signal of said preselected frequency.

5. The invention as recited in claim 4 wherein said second frequency converter and said channel selection means are assembled to form one of said signal receiving means.

6. The invention as recited in claim 1 wherein said verification means comprises a computer having means for storing predetermined date, and means for comparing said stored data to said command signal to produce said control signal.

7. The communications system of claim 6 wherein said verification means further comprises means for recording said control signal.

8. The invention as recited in claim 1 wherein said channel selection means further comprises a manually operated unit for generating said command signal.

9. The invention as recited in claim 8 wherein said manually operated unit includes a keyboard.

10. The invention as recited in claim 1 wherein said microprocessor-turned frequency conversion means is further connected to said channel selection means for converting a second preselected one of said plurality of information signals to said preselected frequency in response to a corresponding command signal pending receipt of said control signal from said verification means.

11. The invention as recited in claim 10 further comprising a transmission means for connecting said verification means, said information source, and said microprocessor-tuned frequency conversion means and for carrying said information signals, said command signals and said control signal.

12. The invention as recited in claim 11 wherein said control signal and information signals are carried by said transmission means within a first frequency range and said command signal is carried by said transmission means within a second frequency range, distinct from said first frequency range.

13. The invention as recited in claim 12 wherein said verification means further comprises means for converting said control signal to said first frequency range, and wherein said microprocessor-tuned frequency conversion means further comprises means for converting said command signal to said second frequency range.

14. The invention as recited in claim 12 wherein said transmission means further comprises a filter means for separating signals in said first frequency range from signals in said second frequency range.

15. The invention as recited in claim 14 wherein said transmission means further comprises means for amplying said separated signals in said first and said second frequency ranges.

16. In a communication system including a source of information signals and a plurality of means for receiving signals, each at a preselected frequency, a control network comprising:
a plurality of channel selection means, each corresponding to one of a plurality of signal receiving means, and operable for generating a command signal;
a microprocessor in communicative connection with said plurality of channel selection means for generating, for each of said channel selection means, a verification signal and a first tuning signal in response to said command signal;
frequency conversion means in communicative connection with said microprocessor, said source of information signals and said plurality of signal receiving means for tuning a first preselected one of said information signals to the preselected frequency of one of said signal receiving means in response to said first tuning signal;
verification means in communicative connection with said microprocessor for generating control signals of a first and second type in response to said verification signal;
said microprocessor generating a second tuning signal in response to said control signal of said type;
wherein said frequency conversation means is operable for tuning a second preselected one of said information operable for tuning a second preselected one signals to the preselected frequency of said one signal receiving means in response to said second tuning signal.

17. The invention as recited in claim 16 wherein the system further comprises auxiliary means in communicative connection with said micropressor means for performing an auxiliary function.

18. The invention as recited in claim 17 wherein said auxiliary means comprises an alarm circuit for generating an alarm signal in response to detection of a predetermined condition.

19. The invention as recited in claim 18 wherein said microprocessor generates an interrogation signal and said alarm circuit generates an answer signal in response to said interrogation signal in the absence of said predetermined condition, whereupon detection of said predetermined condition results in the absence of said answer signal and generating of said alarm signal.

20. The invention as recited in claim 17 wherein said auxiliary means comprises a reading means connected to at least one utility meter for determining the status of said utility meter, said reading means generating a data signal in response to said status determination and delivering said signal to said microprocessor means.

21. The invention as recited in claim 17 wherein said auxiliary means comprises a load management means connected to a device for controlling operation of said device in response to a load signal generated by said microprocessor means.

22. A method of providing secure subscription communication of a plurality of information signals from a central location to at least two subscriber locations, each subscriber location having means for receiving signals of a preselected frequency through a corresponding subscriber drop line, comprising the steps of:
providing a tunable frequency converter physically separated from and spaced apart from the signal receiving means at said subscriber locations, said tunable frequency converter interconnecting said information signals from said central location with each of said signal receiving means at said subscriber locations through said corresponding drop line;
generating a command signal at a first of the subscriber locations;
tuning said frequency converter in response to said command signal for converting a first preselected one of said plurality of information signals to the preselected frequency of a first signal receiving means at said first subscriber location; and
delivering said first preselected one of said information signals at the preselected frequency of said first signal receiving means to said first subscriber location via said corresponding drop line.

23. The method as recited in claim 22 comprising the additional steps of:
- detecting and verifying said command signal;
- generating a control signal upon detection and verification of said command signal;
- tuning said frequency converter in response to said control signal for converting a second preselected one of said information signals to the preselected frequency of said first signal receiving means; and
- delivering said second preselected one of said plurality of information signals at the preselected frequency of said first signal receiving means to said first subscriber location via said corresponding drop line.

24. The method as recited in claim 22 wherein said tuning step comprises the steps of:
- converting said first preselected one of said information signals to an intermediate frequency, and
- converting said information signal of said intermediate frequency to said predetermined frequency of said first signal receiving means.

* * * * *